Nov. 27, 1945. T. S. CHRISTENSON, JR  2,389,610
KNOB ADAPTER
Filed Jan. 8, 1944
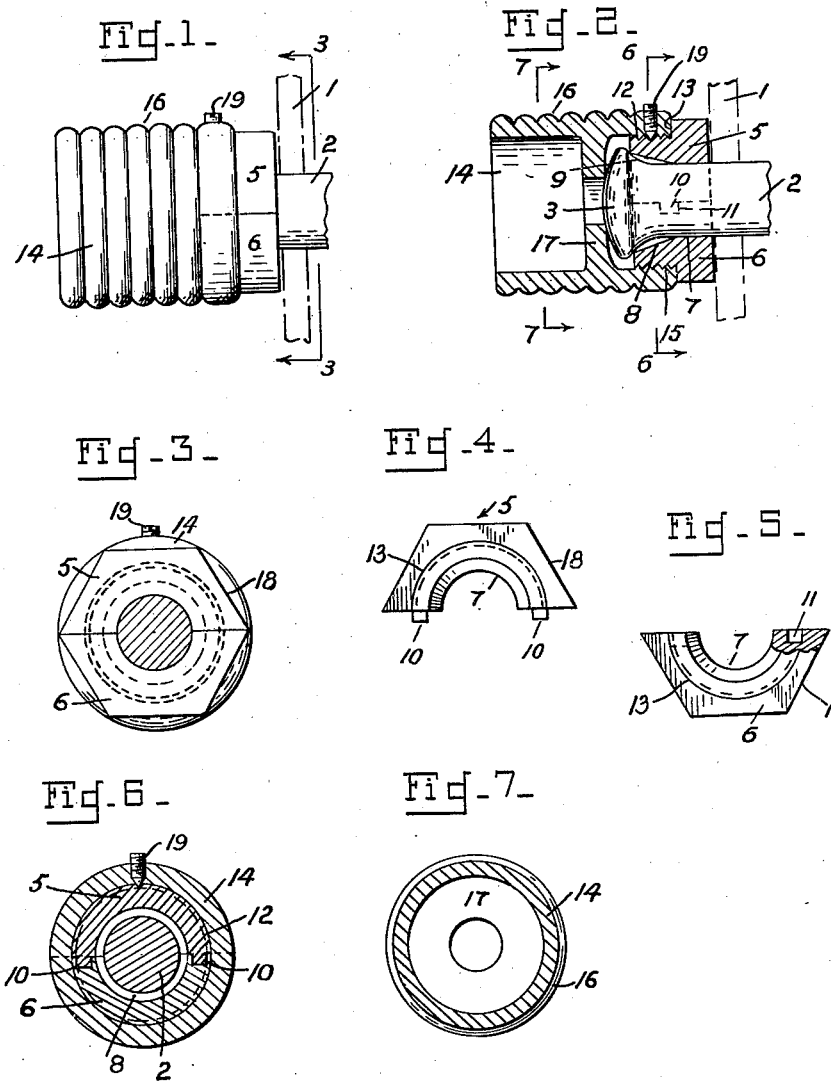
Inventor
Trace S. Christenson, Jr.
By C. E. Kerrstrom + W. E. Thibodeau
Attorneys Patented Nov. 27, 1945

2,389,610

UNITED STATES PATENT OFFICE 2,389,610

KNOB ADAPTER

Trace S. Christenson, Jr., Detroit, Mich.

Application January 8, 1944, Serial No. 517,528

4 Claims. (Cl. 287—53)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to a knob adapter in the nature of an enlargement to be applied on an existing knob or stem. One use of such a device occurs in connection with the instrument panel of a motor vehicle equipped with operating knobs. Under some conditions, as in military operation, the knobs originally supplied on the panel are too small to be readily grasped and operated. The object of the invention, therefore, is to provide an enlargement that can easily be applied on the knob.

The device includes a split ring or bushing adapted to be fitted on the stem of the knob adjacent to the end thereof. The bushing is externally threaded to receive a tapped sleeve which becomes the head of the enlarged knob. The sections of the bushing have alining means to bring the threads thereof into register. The outer surface of the sleeve is beaded or ribbed circumferentially, or otherwise shaped, to reduce slippage of the operator's hand.

An illustrative embodiment of the invention is disclosed in the detailed description and in the accompanying drawing in which:

Figure 1 is an elevation of the device applied to a knob;

Figure 2 is a longitudinal section thereof;

Figure 3 is an end view;

Figures 4 and 5 are end views of the split sections of the bushings, respectively; and Figures 6 and 7 are sections on the lines 6—6 and 7—7 of Figure 2.

With reference to these views by corresponding numerals, there is shown a conventional knob mounted in a wall 1 and including a stem 2 and a head 3. As already indicated, this type of knob is furnished as standard equipment on the panel of an automotive vehicle or other apparatus and is too small to be operated satisfactorily under some conditions, for example, when the driver or operator must wear heavy gloves.

The device of the invention includes semi-cylindrical sections 5 and 6 of a split bushing or collar. The sections have, for a portion of their length, an internal bore 7 dimensioned to the circumference of the stem 2. At one end the bore is flared at 8 to accommodate a somewhat similarly shaped part 9 of the head 3, but has a maximum circumference smaller than that of the head. At the split, as shown in Figures 4 and 5, section 5 has lobes 10, the two lobes being diametrically opposite each other, and section 6 has depressions 11 to receive the corresponding lobes. These formations are located in such manner as to bring the sections 5 and 6 into concentric relation and the threads in register.

The sections are threaded externally at 12 for a portion of their length and are formed with a shoulder 13 at the inner end of the thread. The sections 5 and 6 are assembled on the knob 2, 3 in the position in Figure 2.

A substantially cylindrical sleeve 14 with an internal thread 15 is adapted to be screwed on the threads 12. It will be understood in this connection that the circumferential alinement of the threads 12 is comparatively simple after the axial alinement by means of the formations 10, 11 in the manner already described.

The sleeve 14 is formed with an internal rib 17 that abuts the head 3 as the sleeve is screwed up on the threads 12. The head 3 is thereby wedged against the flared recess 8, whereby the adapter assembly is anchored on the knob 2, 3. A set screw 19 is mounted in the sleeve 14 to lock the latter in place. The inner ends of the sections 5, 6 form a hexagon 18 for a tool.

The outer surface of the sleeve 14 is made non-slipping by a suitable formation that breaks up the cylindrical surface. This formation may consist, for example, of a series of circumferential ribs 16. It is apparent that the sleeve now constitutes an enlarged knob to meet the conditions described.

The parts of the device are so shaped that they readily lend themselves to molding from a plastic material to form the portions 10 and 11, the threads 12, 15 and the ribs 16 in the initial operation.

While one specific embodiment of the invention has been shown and been described, it will be understood that various alterations may be made without departure from the spirit of the invention as indicated by the appended claims.

What I claim is:

1. A knob adapter for a knob having a head and a stem comprising a split bushing having an external thread, a tapped sleeve adapted to be screwed on said thread, and an internal rib in said sleeve, said bushing having an axial bore engageable with the stem of the knob, said bore having a flared end engageable with the head of the knob.

2. A knob adapter for a knob having a head and a stem comprising a split bushing having an external thread, and a tapped sleeve adapted to be screwed on said thread, said bushing having an axial bore engageable with the stem of the knob, said bore having a flared end engageable with the head of the knob.

3. An adapter for attachment to a knob having a stem and a head, comprising a split bushing having an external thread along a portion of its length and an external shoulder at the inner end of said thread, a tapped sleeve adapted to be screwed on said thread, and an internal rib in said sleeve intermediate the ends thereof adapted to abut the head of the knob, said bushing having an axial bore engageable with the stem of the knob, said bore having a flared end engageable with the head of the knob.

4. A knob adapter for a knob having a stem and an enlarged head, comprising a split bushing having an axial bore and an external thread, said bushing being adapted to embrace the stem of the knob and to abut the inner side of the enlarged head of the knob, a tapped sleeve adapted to be screwed on the external thread of said split bushing, and an internal rib in said sleeve adapted to abut the outer side of the enlarged head of the knob to clamp said enlarged head between said sleeve and said split bushing.

TRACE S. CHRISTENSON, Jr.